United States Patent [19]

Micali

[11] Patent Number: 5,315,658

[45] Date of Patent: * May 24, 1994

[54] FAIR CRYPTOSYSTEMS AND METHODS OF USE

[76] Inventor: Silvio Micali, 459 Chestnut Hill Ave., Brookline, Mass. 02146

[*] Notice: The portion of the term of this patent subsequent to Jan. 4, 2011 has been disclaimed.

[21] Appl. No.: 49,929

[22] Filed: Apr. 19, 1993

Related U.S. Application Data

[63] Continuation-in-part of Ser. No. 870,935, Apr. 20, 1992, Pat. No. 5,276,737.

[51] Int. Cl.$^5$ .............................................. H04K 1/00
[52] U.S. Cl. ...................................... 380/30; 380/28; 380/48
[58] Field of Search ....................... 380/23, 24, 25, 28, 380/29, 30

[56] References Cited

U.S. PATENT DOCUMENTS

| | | |
|---|---|---|
| 4,375,579 | 3/1983 | Davida et al. |
| 4,405,829 | 9/1983 | Rivest et al. |
| 4,933,970 | 6/1990 | Shamir |
| 5,006,200 | 4/1991 | Fischer |
| 5,018,196 | 5/1991 | Takaragi et al. |
| 5,136,643 | 8/1992 | Fischer |
| 5,150,411 | 9/1992 | Maurer |
| 5,199,070 | 3/1993 | Matsuzaki et al. ..................... 380/30 |
| 5,214,698 | 5/1993 | Smith, Sr. et al. ................ 380/23 X |
| 5,276,737 | 1/1994 | Micali .................................... 380/30 |

OTHER PUBLICATIONS

Shamir, "How to Share A Secret", Communications of the ACM, vol. 22, No. 11, pp. 612–613, Nov., 1979.
Blakley, "Safeguarding Cryptographic Keys", AFIPS–Conference Proceedings, vol. 48, pp. 313–317, 1979.
Chor, et al, "Verifiable Secret Sharing and Achieving Simultaneity in the Presence of Faults", IEEE, pp. 383–395, 1985.
Benaloh, "Secret Sharing Homomorphisms: Keeping Shares of a Secret Secret", CRYPTO, pp. 1–2, Jul. 18, 1966.
Goldreich, et al., "How to Play Any Mental Game or A Completeness Theorem for Protocols with Honest Majority", ACM, pp. 218–229, 1987.
Ben-Or, "Completeness Theorems for Non-Cryptographic Fault-Tolerant Distributed Computation", ACM, pp. 1–10, 1988.
Chaum, et al, "Multiparty Unconditionally Secure Protocols", ACM, pp. 11–19, 1988.
Rabin, et al, "Verifiable Secret Sharing and Multiparty Protocols with Honest Majority", ACM, pp. 73–83, 1989.
Feldman, "A Practical Scheme For Non-Interactive Verifiable Secret Sharing", IEEE, pp. 427–437, 1987.
Diffie, et al, "New Directions in Cryptography", IEEE Transactions on Information Theory, vol. 22, No. 6, pp. 644–654, Nov. 1976.
Rivest, et al, "A Method for Obtaining Digital Signatures and Public Key Cryptosystems", ACM, vol. 21, No. 2, pp. 120–126, Feb., 1978.
Brassard, et al, "Minimum Disclosure Proofs of Knowledge", Journal of Computer and System Sciences 37, pp. 156–189, 1988.
Goldreich, et al, "Proofs That Yield Nothing But Their Validity and a Methodology of Cryptographic Protocol Design", IEEE, pp. 174–187, 1986.

*Primary Examiner*—Tod R. Swann
*Attorney, Agent, or Firm*—David H. Judson

[57] ABSTRACT

A method, using a public-key cryptosystem, for enabling a predetermined entity to monitor communications of users suspected of unlawful activities while protecting the privacy of law-abiding users, wherein each user is assigned a pair of matching secret and public keys. According to the method, each user's secret key is broken into shares. Then, each user provides a plurality of "trustees" pieces of information. The pieces of information provided to each trustee enable that trustee to verify that such information includes a "share" of a secret key of some given public key. Each trustee can verify that the pieces of information provided include a share of the secret key without interaction with any other trustee or by sending messages to the user. Upon a predetermined request or condition, e.g., a court order authorizing the entity to monitor the communications of a user suspected of unlawful activity, the trustees reveal to the entity the shares of the secret key of such user. This enables the entity to reconstruct the secret key and monitor the suspect user's communications.

13 Claims, 1 Drawing Sheet

FAIR CRYPTOSYSTEMS AND METHODS OF USE

This application is a continuation-in-part of prior copending application Ser. No. 07/870,935, filed Apr. 20, 1992 now U.S. Pat. No. 5,276,737.

TECHNICAL FIELD

The present invention relates generally to cryptosystems and more particularly to methods for enabling a given entity to monitor communications of users suspected of unlawful activities while protecting the privacy of law-abiding users.

BACKGROUND OF THE INVENTION

In a single-key cryptosystem a common secret key is used both to encrypt and decrypt messages. Thus only two parties who have safely exchanged such a key beforehand can use these systems for private communication. This severely limits the applicability of single-key systems.

In a double-key cryptosystem, the process of encrypting and decrypting is instead governed by different keys. In essence, one comes up with a pair of matching encryption and decryption keys. What is encrypted using a given encryption key can only be decrypted using the corresponding decryption key. Moreover, the encryption key does not "betray" its matching decryption key. That is, knowledge of the encryption key does not help to find out the value of the decryption key. The advantage of double-key systems is that they can allow two parties who have never safely exchanged any key to privately communicate over an insecure communication line (i.e., one that may be tapped by an adversary). They do this by executing an on-line, private communication protocol.

In particular, Party A alerts Party B that he wants to talk to him privately. Party B then computes a pair of matching encryption and decryption keys ($E_B$, $D_B$). B then sends A key $E_B$. Party A now encrypts his message m, obtaining the ciphertext $c=E_B(m)$, and sends c to B over the insecure channel. B decrypts the ciphertext by computing $m=D_B(c)$. If an adversary eavesdrops all communication between A and B, will then hear both B's encryption key, $E_B$, and A's ciphertext, c. However, since the adversary does not know B's decryption key, $D_B$, he cannot compute m from c.

The utility of the above protocol is still quite limited since it suffers from two drawbacks. First, for A to send a private message to B it is necessary also that B send a message to A, at least the first time. In some situations this is a real disadvantage. Moreover, A has no guarantee (since the line is insecure anyway) that the received string $D_B$ really is B's encryption key. Indeed, it may be a key sent by an adversary, who will then understand the subsequent, encrypted transmission.

An ordinary public-key cryptosystem ("PKC") solves both difficulties and greatly facilitates communication. Such a system essentially consists of using a double-key system in conjunction with a proper key management center. Each user X comes up with a pair of matching encryption an decryption keys ($E_X$, $D_X$) of a double-key system. He keeps $D_X$ for himself and gives $E_X$ to the key management center. The center is responsible for updating and publicizing a directory of correct public keys for each user, that is, a correct list of entries of the type (X, $E_X$). For instance, upon receiving the request from X to have $E_X$ as his public key, the center properly checks X's identity, and (digitally) signs the pair (X, $E_X$), together with the current date if every encryption key has a limited validity. The center publicizes $E_X$ by distributing the signed information to all users in the system. This way, without any interaction, users can send each other private messages via their public, encryption key that they can look up in the directory published by the center. The identity problem is also solved, since the center's signature of the pair (X, $E_X$) guarantees that the pair has been distributed by the center, which has already checked X's identity.

The convenience of a PKC depends on the key management center. Because setting up such a center on a grand scale requires a great deal of effort, the precise protocols to be followed must be properly chosen. Moreover, public-key cryptography has certain disadvantages. A main disadvantage is that any such system can be abused, for example, by terrorists and criminal organizations who can use their own PKC (without knowledge of the authorities) and thus conduct their illegal business with great secrecy and yet with extreme convenience.

It would therefore be desirable to prevent any abuse of a public key cryptosystem while maintaining all of its lawful advantages.

BRIEF SUMMARY OF THE INVENTION

It is an object of the present invention to provide methods for enabling a given entity, such as the government, to monitor communications of users suspected of unlawful activities while at the same time protecting the privacy of law-abiding users.

It is a further object of the invention to provide such methods using either public or private key cryptosystems.

It is a still further object of the invention to provide so-called "fair" cryptosystems wherein an entity can monitor communications of suspect users only upon predetermined occurrences, e.g., the obtaining of a court order.

It is another object to describe methods of constructing fair cryptosystems for use in such communications techniques.

In one embodiment, these and other objects of the invention are provided in a method, using a public-key cryptosystem, for enabling a predetermined entity to monitor communications of users suspected of unlawful activities while protecting the privacy of law-abiding users, wherein each user is assigned a pair of matching secret and public keys. According to the method, each user's secret key is broken into shares. Then, each user provides a plurality of "trustees" pieces of information. The pieces of information provided to each trustee enable that trustee to verify that such information includes a "share" of a secret key of some given public key. Further, each trustee can verify that the pieces of information provided include a share of the secret key without interaction with any other trustee or by sending messages to the user. Upon a predetermined request or condition, e.g., a court order authorizing the entity to monitor the communications of a user suspected of unlawful activity, the trustees reveal to the entity the shares of the secret key of such user to enable the entity to reconstruct the secret key and monitor the suspect user's communications.

The method can be carried out whether or not the identity of the suspect user is known to the trustees, and even if less than all of the shares of the suspect user's secret key are required to be revealed in order to reconstruct the secret key. The method is robust enough to be effective if a given minority of trustees have been compromised and cannot be trusted to cooperate with the entity. In addition, the suspect user's activities are characterized as unlawful if the entity, after reconstructing or having tried to reconstruct the secret key, is still unable to monitor the suspect user's communications.

According to another more generalized aspect of the invention, a method is described for using a public-key cryptosystem for enabling a predetermined entity to monitor communications of users suspected of unlawful activities while protecting the privacy of law-abiding users. The method comprises the step of "verifiably secret sharing" each user's secret key with a plurality of trustees so that each trustee can verify that the share received is part of a secret key of some public key.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
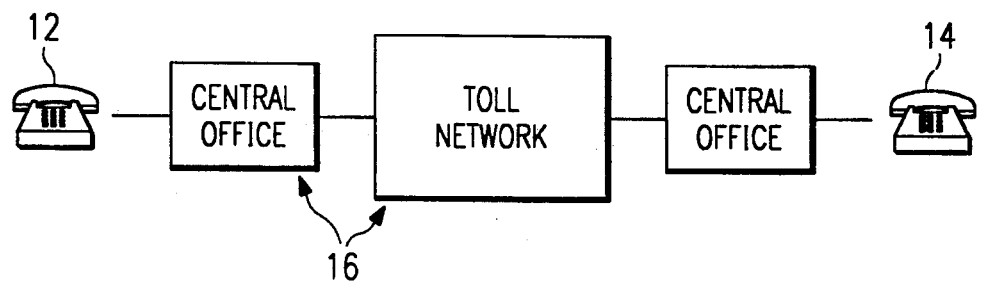
FIG. 1 is a simplified diagram of a communications system over which a government entity desires to monitor communications of users suspected of unlawful activities.
Figure 2:
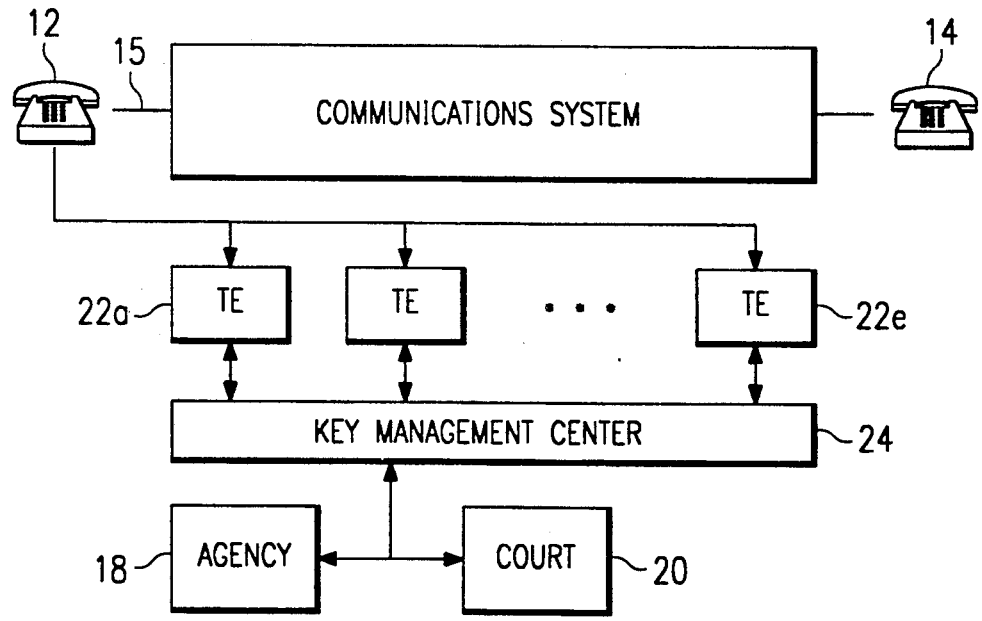
FIG. 2 is a block diagram of a preferred hierarchy of entities that may use the methods of the present invention to monitor communications of users suspected of unlawful activities.

FIG. 1 represents a simple communications system 10 comprising a telephone network connected between a calling station 12 and a called station 14. One or more local central offices or telephone switches 16 connect telephone signals over the network in a well-known fashion. Referring now also to FIG. 2, assume that a government entity, such as local law enforcement agency 18, desires to monitor communications to and/or from calling station 12 because the user of such calling station is suspected of unlawful activity. Assume further that the user of the calling station 12 communicates using a PKC. Following accepted legal practices, the agency 18 obtains a court order from court 20 to privately monitor the line 15. According to the present invention, the agency's is able to monitor the line 15 while at the same time the privacy rights of other law-abiding users of the network are maintained. This is accomplished as will be described by requiring that each user "secret share" the user's secret key (of the PKC) with a plurality of trustees 22a ... 22n.

According to the invention, a "fair" PKC is a special type of public-key cryptosystem. Every user can still choose his own keys and keep secret his private one; nonetheless, a special agreed-upon party (e.g., the government), and solely this party, under the proper circumstances envisaged by the law (e.g., a court order), and solely under these circumstances, is authorized to monitor all messages sent to a specific user. A fair PKC improves the security of the existing communication systems (e.g., the telephone service 10) while remaining within the constraints of accepted legal procedures.

In one embodiment, fair PKC's are constructed in the following general way. Referring now to FIGS. 1-2, it is assumed that there are five (5) trustees 22a ... 22e and that the government desires, upon receiving a court order, to monitor the telephone communications to or from the calling station 12. Although the above-description is specific, it should be appreciated that users of the communications system and trustees may be people or computing devices. It is preferable that the trustees are chosen to be trustworthy. For instance, they may be judges (or computers controlled by them), or computers specially set up for this purpose. The trustees, together with the individual users, play a crucial role in deciding which encryption keys will be published in the system.

Each user independently chooses his own public and secret keys according to a given double-key system (for instance, the public key consists of the product of two primes, and the secret key one of these two primes). Since the user has chosen both of his keys, he can be sure of their "quality" and of the privacy of his decryption key. He then breaks his secret decryption key into five special "pieces" (i.e., he computes from his decryption key 5 special strings/numbers) possessing the following properties:

(1) The private key can be reconstructed given knowledge of all five, special pieces;
(2) The private key cannot be guessed at all if one only knows (any) 4, or less, of the special pieces;
(3) For $i=1, \ldots 5$, the i-th special piece can be individually verified to be correct.

Given all 5 special pieces or "shares", one can verify that they are correct by checking that they indeed yield the private decryption key. According to one feature of the invention, property (3) insures that each special piece can be verified to be correct (i.e., that together with the other 4 special pieces it yields the private key) individually, i.e., without knowing the secret key at all and without knowing the value of any of the other special pieces.

The user then privately (e.g., in encrypted form) gives trustee 22i his own public key and the i-th piece of its associated secret key. Each trustee 22 individually inspects his received piece, and, if it is correct, approves the public key (e.g. signs it) and safely stores the piece relative to it. These approvals are given to a key management center 24, either directly by the trustees, or (possibly in a single message) by the individual user who collects them from the trustees. The center 24, which may or may not coincide with the government, itself approves (e.g., signs) any public key that is approved by all trustees. These center-approved keys are the public keys of the fair PKC and they are distributed and used for private communication as in an ordinary PKC.

Because the special pieces of each decryption key are privately given to the trustees, an adversary who taps the communication line of two users possesses the same information as in the underlying, ordinary PKC. Thus if the underlying PKC is secure, so is the fair PKC. Moreover, even if the adversary were one of the trustees himself, or even a cooperating collection of any four out of five of the trustees, property (2) insures that the adversary would still have the same information as in the ordinary PKC. Because the possibility that an adversary corrupts five out of five judges is absolutely remote, the security of the resulting fair PKC is the same as in the underlying PKC.

When presented with a court order, for example, the trustees 22 reveal to the government 20 the pieces of a given decryption key in their possession. According to the invention, the trustees may or may not be aware of the identity of the user who possesses the given decryption key. This provides additional security against "compromised" trustees who might otherwise tip off the suspect user once a request for that user's decryption key share is received by the trustee.

Upon receiving the shares, the government reconstructs the given decryption key. By property (3), each trustee previously verified whether he was given a correct special piece of a given decryption key. Moreover, every public key was authorized by the key management center 24 only if it was approved by all trustees 22. Thus, the government is guaranteed that, in case of a court order, it will be given all special pieces of any decryption key. By property (1), this is a guarantee that the government will be able to reconstruct any given decryption key if necessary to monitor communications over the network.

Several types of fair PKC's are now described in more detail.

Diffie and Hellman's PKC

The Diffie and Hellman public-key cryptosystem is known and is readily transformed into a fair PKC by the present invention. In the Diffie and Hellman scheme, each pair of users X and Y succeeds, without any interaction, in agreeing upon a common, secret key $S_{xy}$ to be used as a conventional single-key cryptosystem. In the ordinary Diffie-Hellman PKC, there are a prime p and a generator (or high-order element) g common to all users. User X secretly selects a random integer Sx in the interval [1, p−1] as his private key and publicly announces the integer $P_x = g^{S_x}$ mod p as his public key. Another user, Y, will similarly select Sy as his private key and announce $P_y = g^{S_y}$ mod p as his public key. The value of this key is determined as $S_{xy} = g^{S_x S_y}$ mod p. User X computes Sxy by raising Y's public key to his private key mod pX, and user Y by raising X's public key to his secret key mod p. In fact:

$$(g^{S_x})^{S_y} = g^{S_x S_y} = S_{xy} = g^{S_y S_x} = (g^{S_y})^{S_x} \mod p.$$

While it is easy, given g, p and x, to compute $y = g^x$ mod p, no efficient algorithm is known for computing, given y and p, x such that $g^x = y$ mod p when g has high enough order. This is the discrete logarithm problem. This problem has been used as the basis of security in many cryptosystems. The Diffie and Hellman's PKC is transformed into a fair one in the following manner.

Each user X randomly chooses 5 integers $S_{x1}, \ldots, S_{x5}$ in the interval [1, p−1] and lets Sx be their sum mod p. It should be understood that all following operations are modulo p. User X then computes the numbers:

$$t1 = g^{S_{x1}}, \ldots, t5 = g^{S_{x5}} \text{ and } P_x = g^{S_x}.$$

Px will be User X's public key and Sx his private key. The ti's will be referred to as the public pieces of Px, and the Sxi's as the private pieces. It should be noted that the product of the public pieces equals the public key Px. In fact:

$$t1 \ldots t5 = g^{S_{x1}} \ldots g^{S_{x5}} = g^{(S_{x1} + \ldots + S_{x5})} = g^{S_x}.$$

Let T1, ..., T5 be the five trustees. User X now gives Px, the public pieces and Sx1 to trustee T1, Px, the public pieces and Sx2 to trustee T2, and so on. Piece Sxi is privately given to trustee Ti. Upon receiving public and private pieces ti and Sxi, trustee Ti verifies whether $g^{S_{xi}} = T_i$. If so, the trustee stores the pair (Px, Sxi), signs the sequence (Px,t1,t2,t3,t4,t5) and gives the signed sequence to the key management center 24 (or to user X, who will then give all of the signed public pieces at once to the key management center). Upon receiving all the signed sequences relative to a given public key Px, the key management center verifies that these sequences contain the same subsequence of public pieces t1 ... t5 and that the product of the public pieces indeed equals Px. If so, center 24 approves Px as a public key and distributes it as in the original scheme (e.g., signs it and gives it to user X). The encryption and decryption instructions for any pair of users X and Y are exactly as in the Diffie and Hellman scheme (i.e., with common, secret key Sxy).

This way of proceeding matches the previously-described way of constructing a fair PKC. A still fair version of the Diffie-Hellman scheme can be obtained in a simpler manner by having the user give to each trustee Ti just the public piece ti and its corresponding private piece Sxi, and have the user give the key management center the public key Px. The center will approve Px only if it receives all public pieces, signed by the proper trustee, and the product of these public pieces equals Px. In this way, trustee Ti can verify that Sxi is the discrete logarithm of public piece ti. Such trustee cannot quite verify that Sxi is a legitimate share of Px since the trustee has not seen Px or the other public pieces. Nonetheless, the result is a fair PKC based on the Diffie-Hellman scheme because properties (1)–(3) described above are still satisfied.

Either one of the above-described fair PKC has the same degree of privacy of communication offered by the underlying Diffie-Hellman scheme. In fact, the validation of a public key does not compromise the corresponding private key. Each trustee Ti receives, as a special piece, the discrete logarithm, Sxi, of a random number, ti. This information is clearly irrelevant fr computing the discrete logarithm of Px. The same is actually true for any 4 of the trustees taken together, since any four special pieces are independent of the private decryption key Sx. Also the key management center does not possess any information relevant to the private key; i.e., the discrete logarithm of Px. All the center has are the public pieces respectively signed by the trustees. The public pieces simply are 5 random numbers whose product is Px. This type of information is irrelevant for computing the discrete logarithm of Px; in fact, any one could choose four integers at random and setting the fifth to be Px divided by the product of the first four. The result would be integral because division is modulo p. As for a trustee's signature, this just represents the promise that someone else has a secret piece.

Even the information in the hands of the center together with any four of the trustees is irrelevant for computing the private key Sx. Thus, not only is the user guaranteed that the validation procedure will not betray his private key, but he also knows that this procedure has been properly followed because it is he himself that computes his own keys and the pieces of his private one.

Second, if the key management center validates the public key Px, then its private key is guaranteed to be reconstructable by the government in case of a court order. In fact, the center receives all 5 public pieces of Px, each signed by the proper trustee. These signatures testify that trustee Ti possesses the discrete logarithm of public piece ti. Since the center verifies that the product of the public pieces equals Px, it also knows that the sum of the secret pieces in storage with the trustees equals the discrete logarithm of Px; i.e, user X's private key. Thus the center knows that, if a court order were issued requesting the private key of X, the government is guaranteed to obtain the needed private key by summing the values received by the trustees.

RSA Fair PKC

The following describes a fair PKC based on the known RSA function. In the ordinary RSA PKC, the public key consists of an integer N product of two primes and one exponent e (relatively prime with f(N), where F is Euler's quotient function). No matter what the exponent, the private key may always be chosen to be N's factorization. By way of brief background, the RSA scheme has certain characteristics that derive from aspects of number theory:

Fact 1. Let $Z_N^*$ denote the multiplicative group of the integers between 1 and N and relatively prime with N. If N is the product of two primes N=pq (or two prime powers: $N=p^a p^b$), then (1) a number s in $Z_N^*$ is a square mod N if and only if it has four distinct square-roots mod N: x, −x mod N, y, and −y mod N (i.e., $x^2 = y^2 = s$ mod N). Moreover, from the greatest common divisor of +−x+−y and N, one easily computes the factorization of N. Also;

(2) one in four of the numbers in $Z_N^*$ is a square mod N.

Fact 2. Among the integers in $Z_N^*$ is defined a function, the Jacobi symbol, that evaluates easily to either 1 or −1. The Jacobi symbol of x is denoted by (s/N). The Jacobi symbol is multiplicative; i.e., (x/N)(Y/N)=(x-y/N). If N is the product of two primes N=pq (or two prime powers: $N=p^a p^b$), the p and 1 are congruent to 3 mod 4. Then, if +−x and +−y are the four square roots of a square mod N (s/N)=(−x/N)=+1 and (y/N)=(−y/N)=−1. Thus, because of Fact 1, if one is given a Jacobi symbol 1 root and a Jacobi symbol −1 root of any square, he can easily factor N.

With this background, the following describes how the RSA cryptosystem can be made fair in a simple way. For simplicity again assume there are five trustees and that all of them must collaborate to reconstruct a secret key, while no four of them can even predict it. The RSA cryptosystem is easily converted into a fair PKC by efficiently sharing with the trustee's N's factorization. In particular, the trustees are privately provided information that, perhaps together with other given common information, enables one to reconstruct two (or more) square roots x and y (x different from ±y mod N) of a common square mod N. The given common information may be the −1 Jacobi symbol root of $X^2$, which is equal to y.

A user chooses P and Q primes congruent to 3 mod 4, as his private key and N=PQ as his public key. Then he chooses 5 Jacobi 1 integers $X_1, X_2, X_3, X_4$ and $X_5$ (preferably at random) in $Z_N^*$ and computes their product, X, and $X_i^2$ mod N for all i=1, ..., 5. The product of the last 5 squares, Z, is itself a square. One square root of Z mod N is X, which has Jacobi symbol equal to 1 (since the Jacobi symbol is multiplicative). The user computes Y, one of the Jacobi −1 roots mod N. $X_1, ... X_5$ will be the public pieces of public key N and the $X_i$'s the private pieces. The user gives trustee Ti private piece $X_i$ (and possibly the corresponding public piece, all other public pieces and Px, depending on whether it is desired that the verification of the shares so as to satisfy properties (1)–(3) is performed by both trustees and the center, or the trustees alone). Trustee Ti squares Xi mod N, gives the key management center his signature of $X_i^2$, and stores $X_i$.

The center first checks that (−1/N)=1, i.e., for all x: (x/N)=(−x/N). This is partial evidence that N is of the right form. Upon receiving the valid signature of the public pieces of N and the Jacobi −1 value Y from the user, the center checks whether mod N the square of Y equals the product of the five public pieces. If so, it checks, possibly with the help of the user, that N is the product of two prime powers. If so, the center approves N.

The reasoning behind the scheme is as follows. The trustees' signatures of the $X_i^2$'s (mod N) guarantee the center that every trustee Ti has stored a Jacobi symbol 1 root of $X_i^2$ mod N. Thus, in case of a court order, all these Jacobi symbol 1 roots can be retrieved. Their product, mod N, will also have Jacobi symbol 1, since this function is multiplicative, and will be a root of $X^2$ mod N. But since the center has verified that $Y^2 = X^2$ mod N, one would have two roots X and Y of a common square mod N. Moreover, Y is different from X since it has different Jacobi symbol, and Y is also different from −x, since (−x/N)=(s/N) because (a) (−1/N) has been checked to be 1 and (b) the Jacobi symbol is multiplicative. Possession of such square roots, by Facts 1 and 2, is equivalent to having the factorization of N, provided that N is product of at most two prime powers. This last property has also been checked by the center before it has approved N.

Verification that N is the product of at most two prime powers can be performed in various ways. For instance, the center and user can engage in a zero-knowledge proof of this fact. Alternatively, the user may provide the center with the square root mod N for roughly ¼ of the integers in a prescribed and random enough sequence of integers. For instance, such a sequence could be determined by one-way hashing N to a short seed and then expanding it into a longer sequence using a psuedo-random generator. If a dishonest user has chosen his N to be the product of three or more prime powers, then it would be foolish for him to hope that roughly ¼ of the integers in the sequence are squares mod N. In fact, for his choice of N, at most ⅛ of the integers have square roots mod N.

Variations

The above schemes can be modified in many ways. For instance, the proof that N is product of two prime powers can be done by the trustees (in collaboration with the user), who then inform the center of their findings. Also, the scheme can be modified so that the cooperation of the majority of the trustees is sufficient for reconstructing the secret key, while any minority cannot gain any information about the secret key. Also, as with all fair cryptosystems, one can arrange that when the government asks a trustee for his piece of the secret key of a user, the trustee does not learn about the identity of the user. The variations are discussed in more detail below.

In particular, the schemes described above are robust in the sense that some trustees, accidentally or maliciously, may reveal the shares in their possession without compromising the security of the system. However, these schemes rely on the fact that the trustees will collaborate during the reconstruction stage. In fact, it was insisted that all of the shares should be needed for recovering a secret key. This requirement may be disadvantageous, either because some trustees may reveal to be untrustworthy and refuse to give the government the key in their possession, or because, despite all file back-ups, the trustee may have genuinely lost the information in its possession. Whatever the reason, in this circumstance the reconstruction of a secret key will be prevented. This problem is also solved by the present invention.

By way of background, "secret sharing" (with parameters n,T,t) is a prior cryptographic scheme consisting of two phases: in phase one a secret value chosen by a distinguished person, the dealer, is put in safe storage with n people or computers, the trustees, by giving each one of them a piece of information. In phase two, when the trustees pool together the information in their possession, the secret is recovered. Secret sharing has a major disadvantage—it presupposes that the dealer gives the trustees correct shares (pieces of information) about his secret value. "Verifiable Secret Sharing" (VSS) solves this "honesty" problem. In a VSS scheme, each trustee can verify that the share given to him is genuine without knowing at all the shares of other trustees of the secret itself. Specifically, the trustee can verify that, if T verified shares are revealed, the original secret will be reconstructed, no matter what the dealer or dishonest trustees might do.

The above-described fair PKC schemes are based on a properly structured, non-interactive verifiable secret sharing scheme with parameters $n=5$, $T=5$ and $t=4$. According to the present invention, it may be desirable to have different values of these parameters, e.g., $n=5$, $T=3$ and $t=2$. In such case, any majority of the trustees can recover a secret key, while no minority of trustees can predict it all. This is achieved as follows (and be simply generalized to any desired values of n, T and t in which $T>t$).

Subset Method for the Diffie-Hellman Scheme

After choosing a secret key Sx in $[1, p-1]$, user X computes his public key $Px = g^{Sx}$ mod p (with all computations below being mod p). User X now considers all triplets of numbers between 1 and 5: (1,2,3), (2,3,4) etc. For each triplet (a,b,c), user X randomly chooses three integers $S1abc, \ldots, S3abc$ in the interval $[1, p-1]$ so that their sum mod p equals Sx. Then he computes the numbers:

$$t1abc = g^{S1abc}, t2abc = g^{S2abc}, t3abc = g^{S3abc}$$

The tiabc's will be referred to as public pieces of Px, and the Siabc's as private pieces. Again, the product of the public pieces equals the public key Px. In fact,
$t1abc \cdot t2abc \cdot t3abc = g^{S1abc} \cdot g^{S2abc} \cdot g^{S3abc} = g^{(S1abc + \ldots + S3abc)} = g^{Sx} = Px$ User X then gives trustee Ta t1abc and S1abc, trustee Tb t2abc and S2abc, and trustee Tc t3abc and S3abc, always specifying the triplet in question. Upon receiving these quantities, trustee Ta (all other trustees do something similar) verifies that $t1abc = g^{S1abc}$, signs the value (Px, t1abc, (a,b,c)) and gives the signature to the management center.

The key management center, for each triple (a,b,c), retrieves the values t1abc, t2abc and t3abc from the signed information received from trustees, Ta, Tb and Tc. If the product of these three values equals Px and the signatures are valid, the center approves Px as a public key.

The reason the scheme works, assuming that at most 2 trustees are untrustworthy, is that all secret pieces of a triple are needed for computing (or predicting) a secret key. Thus no secret key in the system can be retrieved by any 2 trustees. On the other hand, after a court order at least three trustees reveal all the secret pieces in their possession about a given public key. The government then has all the necessary secret pieces for at least one triple, and thus can compute easily the desired secret key.

Alternatively, each trustee is replaced by a group of new trustees. For instance, instead of a single trustee Ta, there may be three trustees: Ta1, Ta2 and Ta3. Each of these trustees will receive and check the same share of trustee Ta. In this way it is very unlikely that all three trustees will refuse to surrender their copy of the first share.

After having insured that a few potentially malicious trustees cannot prevent reconstruction of the key, there are still further security issues to address, namely, a trustee—requested by a court order to surrender his share of a given secret key—may alert the owner of that key that his communications are about to be monitored. This problem is also solved by the invention. A simple solution arises if the cryptosystem used by the trustees possess certain algebraic properties. This is illustrated for the Diffie-Hellman case, though the same result occurs for the RSA scheme. In the following discussion, for simplicity it is assumed that all trustees collaborate in the reconstruction of the secret key.

Oblivious and Fair Diffie-Hellman Scheme

Assume that all trustees use deterministic RSA for receiving private messages. Thus, let Ni be the public RSA modulus of trustee Ti and ei his encryption exponent (i.e., to send Ti a message m in encrypted form, one would send $m^{ei}$ mod Ni).

User U prepares his public and secret key, respectively Px and Sx (thus $Px = g^{Sx}$ mod p), as well as his public and secret pieces of the secret key, respectively ti and Sxi's (thus $Px = t1, t2 \ldots t5$ mod p and $ti = g^{Sxi}$ mod p for all i). Then, the user gives to the key management center Px, all of the ti's and the n values $Ui = (Sxi)^3$ mod Ni; i.e., he encrypts the i-th share with the public key of trustee Ti. Since the center does not know the factorization of the Ni's, this is not useful information to predict Sx, nor can the center verify that the decryption of the n ciphertexts are proper shares of Sx. For this, the center will seek the cooperation of the n trustees, but without informing them of the identity of the user as will be described.

The center stores the values tj's and Uj's relative to user U and then forwards Ui and ti to trustee Ti. If every trustee Ti verified that the decryption of Ui is a proper private piece relative to ti, the center approves Px.

Assume now that the judicial authority decides to monitor user U's communications. To lawfully reconstruct secret key Sx without leaking to a trustee the identity of the suspected user U, a judge (or another authorized representative) randomly selects a number Ri mod Ni and computes yi=Ri $^{ei}$ mod Ni. Then, he sends trustee Ti the value zi=Ui−yi mod Ni, asking with a court order to compute and send back wi, the ei-th root of zi mod Ni. Since zi is a random number mod Ni, no matter what the value of Ui is, trustee Ti cannot guess the identity of the user U in question. Moreover, since zi is the product of Ui and yi mod Ni, the ei-th root of zi is the product mod Ni of the ei-th root of Ui (i.e., Sxi) and the ei-th root of yi (i.e., Ri). Thus, upon receiving wi, the judge divides it by yi mod Ni, thereby computing the desired Sxi. The product of these Sxi's equals the desired Sx.

Further Variations

In other variations of the invention, in case of a court order, the government is only authorized to understand the messages concerning a given user for a limited amount of time. The collective approval of all trustees may stand for the government approval. Also, trustees need not store their piece of the private key. The encryption of this piece—in the trustee's public key and signed by the trustee—can be made part of the user's public key. In this way, the public key carries the proof of its own authenticity and verification. In the latter case it may be advantageous to break the trustee's private keys into pieces.

If the user is an electronic device, such as an integrated circuit chip, the basic process of key selection and public-key validation can be done before the device leaves the factory. In this case, it may be advantageous that a "copy" of the trustee can be maintained within the factory. A copy of a trustee is a physically secure chip—one whose data cannot be read—containing a copy of the trustee's decryption key. The trustee (i.e., the party capable of giving the piece of a private key under a court order) need not necessarily coincide with this device.

In another variation, it may be arranged that the trustees each a have piece of the government private key, and that each user's private key is encrypted with the public key of the government.

While the use of a fair PKC in a telecommunications network (and under the authority of the government) has been described, such description is not meant to be taken by way of limitation. A fair PKC can be used in private organizations as well. For example, in a large organization where there is a need for privacy, assume there is an established "superior" but not all employees can be trusted since there are too many of them. The need for privacy requires the use of encryption. Because not all employees can be trusted, using a single encryption key for the whole company is unacceptable, as is using a number of single-key cryptosystems (since this would generate enormous key-distribution problems). Having each employee use his own double-key system is also dangerous, since he or she might conspire against the company with great secrecy, impunity and convenience.

In such application of a fair PKC, numerous advantages are obtained. First, each employee is in charge of choosing his own keys. While enjoying the advantages of a more distributed procedure, the organization retains absolute control because the superior is guaranteed to be able to decrypt every employee's communications when necessary. There is no need to change keys when the superior changes because the trustees need not be changed. The trustees' storage places need less surveillance, since only compromising all of them will give an adversary any advantage.

For making fair a private key cryptosystem, but also for a PKC, it is desirable that each trustee first deposits an encrypted version or otherwise committed version of his share, so that, when he is asked to reveal what his share was, he cannot change his mind about its value. Also, it is desirable that the user gives his shares to the trustees signed; such signatures can be relative to a different public key (if they are digital signatures) or to the same new public key if the new key can be used for signing as well. In this way, the share revealed by the trustee clearly proves that it way originated. Better still, the user may sign (with the trustee's key) the encryption of the share given to a trustee, and the signature can be revealed together with the share. This approach insures that one can both be certain that what was revealed was a share approved by the user and also that the trustees and the user cannot collaborate later on in changing its value.

As stated above, it may be desirable to use the fair PKC for time-bounded eavesdropping. A more specific description of such techniques is now described. For the purposes of example only, the following discussion presumes that the monitoring takes place over a telephone system, although of course the invention is not so limited. Currently, if no encryption is used, when a proper court order is given the authorities (such as the state or federal authorities) can and are is allowed to monitor the conversations of a suspected user. However, if this court-authorized line tapping and other investigative procedures do not show any wrongdoing, this monitoring will stop (or at least will stop being legal). This restores the privacy of the erroneously-suspected user. Thus, currently, the citizens must trust the Government that (1) no line-tapping is initiated with a proper court order, and (2) a legitimally-initiated court order is terminated when the court decides so. If a fair PKC is used to encrypt all communications, then the citizens need not trust the Government with respect to the former point. The same guarantee does not, however, hold for the latter consideration. In fact, once the authorities have reconstructed a user's secret key in response to a proper court order, the citizens must still trust (rather than be certain) that the reconstructed secret key will be forgotten and destroyed, so that no further line-tapping can continue after the Court says so. According to the invention, fair PKC's are enhanced so that guarantee also property 2, that is, by allowing time-bounded monitoring.

In one embodiment, time-bounded court-authorized eavesdropping uses secure chips (i.e., chips whose memory—or parts of it—cannot be read from the outside, and cannot be tampered with). One method can now be described. Assume that a proper court order is issued to tap the line of user X from February to April. Since the messages traveling along X's line are encrypted, the authorities will make use of a chip to decode them. Assume that the chip is secure and capable of receiving encrypted messages from the trustees. For instance, the chip possesses a public encryption key PC and a corresponding secret decryption key SC. While PC may be universally known, and is in particular known to the trustees, SC is safely stored within the chip, and actually known only to the chip itself (e.g., because it is the secure chip that has generated both PC and SC). After receiving the court order, each trustee sends a message (preferably digitally signed) to the chip consisting of the share of user X's secret key in his possession, after encrypting it via PC. Since the chip possesses SC, it easily computes all necessary shares of X's secret key, and thus the secret key itself. The court will also provide the chip with a (preferably signed) message consisting of, say "decode, X, February-April." (Alternatively, the time interval can be specified in the message of the trustees, since they learned it from the Court anyway.) Since the chip has an internal clock, it can easily decrypt all X's messages relative to the prescribed time period. Afterwards, user X's secret key will be destroyed. Thus, to allow further line-tapping, a new court order would be required.

Time-bounded eavesdropping also can be implemented by having each user choose different secret keys when he enters the system. This method can actually be quite practical if the court authorizes eavesdropping for convenient time-intervals; for instance, "integral month-multiples." In this case, each user, at the beginning of the year (or of the decade, or ...) chooses 12 secret keys, $SK_1, \ldots, SK_{12}$, together with their corresponding public keys, $PK_1, \ldots, PK_{12}$. Each pair of keys is associated to a determined month—e.g., $SK_1$ and $PK_1$ are January's keys. The user then follows the procedure of a fair PKC so that each trustee receives (and can actually verify to have received) the correct piece of each secret key. This only entails sending each trustee a 12-time longer message than before, and having each trustee perform 12-times more computation. But both these operations are quite simple and need to be done only once per year (per decade, etc.). Like before, after the trustees inform the government that they have been given their respective pieces for each of the months, the government approves the user's public keys. This can be done in several ways. For instance, the government can digitally sign each public key individually—e.g., for user X and for the month of March, it will sign the triplet (X,3,PK3). Thus, though the "one-time" message that user X sends to each trustee when she enters the system is longer, the public key that she needs to send to another user Y (before she can have a private conversation with him) is as short as before. For instance, if X wants to communicate with Y in March, she needs only to send Y the government signature of (X,3,K3). User Y (or his computer) will inspect that this signature is valid and that the current month is March. If so, he will use $K_3$ to communicate to X. Thus, if the Court authorizes eavesdropping for the months of February, March, and April, the trustees only reveal their own pieces of the secret keys of those months. The authorities will have no help in understanding conversations outside this time interval.

In the pre-chosen secret key method described above, each user selected and properly shared with the trustees as many secret keys of a PKC as there are possible transmission "data" (in the above example, each possible month). Within each specified date, the same public-secret key pair was used for communicating with every other user.

It is customary to use public keys only to transmit secure session keys, which are then used to encrypt messages by means of a conventional single-key system. These session keys are usually unique to the pair of users in question and the date of transmission. Indeed, each minute or second can be considered a different date, and thus there may be a different session key for every transmission between two users. Actually, the date, which can be sent in the clear, preferably may just be any progressive number identifying the transmission, but not necessarily related to physical time. Time-bounded court-authorized monitoring can also be achieved in this traditional setting. In particular, preferably session keys are chosen algorithmically (so that the trustees can compute each desired session key from information received when users enter the system), but unpredictably (so that, though some session keys may become known—e.g., because of a given court order—the other session keys remain unknown). Using this approach, one can develop many enhanced fair PKC's, for instance based on RSA and the Diffie-Hellman cryptosystems, so as to exploit advantageously their algebraic structure.

By way of still further background, assume that there is a court order to tap the conversations of user X between dates D1 and D2, and that user X at date D (in the specified time interval) communicates with user Y. If the time-bounded fair PKC requires the police to contact the trustees specifying the triplet (X, Y, D) in order to understand X's communication, the scheme might be considered somewhat impractical because the police would flood the trustees with continuous requests. An improved scheme would allow the police to contact the trustees only once, specifying only X, Y, and D1 and D2, in order to understand all the communications between X and Y at any date D in that time interval. Since, however, there may be quite a number of users Y, the trustees still risk of being flooded with requests from the police. A still better scheme allows the police to go to the Trustees only once, specifying X D1 and D2, in order to understand all communications involving X in that time interval.

The following is an efficient solution to the last scenario (although it should be appreciated that all of the above scenarios are within the scope of this invention and that "intermediate" solutions can be easily derived from it). Assume that X is a user of a fair PKC F. When X wants to initiate a secret conversation with Y at date D, she computes a secret session key SXDY and sends it to Y using F (i.e., encrypts it with Y's public key in F). User Y then computes his secret session key SYDX and sends it to X after encrypting it with the received secret key SXDY (by means of an agreed-upon conventional cryptosystem). User X then sends SYDX to Y by encrypting it with SXDY. After this handshaking, throughout the session, X sends messages to Y conventionally encrypted with SXDY, and Y sends messages to X via SYDX. (If anyone spots that the other disobeys the protocol the communication is automatically terminated, and an alarm signal may be sent to a proper place.) Thus in this example, though X and Y will understand each other perfectly, they will not be using a common, conventional key. Notice that if the police know SXDY (respectively, SYDX), it will also know SYDX (respectively, SXDY).

Assume now that the court authorizes tapping the lines of user X from date D1 to date D2, and that a conversation occurs at a time D in the time interval [D1, D2] between X and Y. The idea is to make SXDY available to the police in a convenient manner, since knowledge of this quantity will enable the police to understand X's out-going and in-coming messages, independently of who between X and Y initiated the call. To make SXDY conventionally available to the Police, we will make it easily computable on input SXD, a master secret key that X uses for computing his own session key at date D with every other user. For instance, $SHDY = H(SXD,Y)$, where H is a secure (possibly hashing) function.

Since there may be many dates D in the desired interval, however, we make sure that SXD is easily computable from a short string, $SX[D1,D2]$, and that short string is itself immediately computable from some short string that the police receive from the trustees when they are presented with the court order "tap X from D1 to D2." For instance, in a 3-out-of-3 case, if $SXi[D1,D2]$ denotes the information received by the police from trustee i in response to the court order:

$$SX[D1,D2] = H(SX1[D1,D2], SX2[D1,D2], SX3[D1,D2]),$$

where H is a secure (possibly hashing) function. Letting $SX_i$ be the value originally given to trustee i by user X when she entered the system (i.e., X gives SXi to trustee i together with the i-th piece of her own secret key in the fair PKC F), $SXi[D1,D2]$ should easily depend on SXi. An effective choice of SXi, $SXi[D1,D2]$, and $SX[D1,D2]$, and SXD is then made. Assume that there are $2^d$ possible dates. Imagine a binary tree with $2^d$ leaves, whose nodes have n-bit identifiers—where $n = 0, \ldots, d$. Quantity $SXi[D1,D2]$ is computed from SXi by storing a value at each of the nodes of the tree. The value stored at the root, node $N\epsilon$ (where $\epsilon$ is the empty word), is $SX_i$. Then a secure function G is evaluated on value SXi so as to yield two values, SXi0 and SXi1. Preferably the function is such that the value SXi is unpredictable given SXi0 and SXi1. (For instance, SXi is a random k-bit value and G is a secure pseudo-random number generator that, using SXi as a seed, outputs 2k bits: the first k will constitute value SXi0, the second k value SXi1.) Value SXi0 is then stored in the left child of the root (i.e., it is stored in node N0) and value SXi1 is stored in the right child of the root (node N1). The values of below nodes in the tree are computed using G and the value stored in their ancestor in a similar way. Let SXiD be the value stored in leaf D (where D is a n-bit date). If $D1 < D2$ are n-bit dates, then assume that a node N controls the interval $[D1,D2]$ if every leaf in the tree that is a descendent of N belongs to $[D1,D2]$, while no proper ancestor of N has this property.

Then, if $SXi[D1,D2]$ consists of the (ordered) sequence of values stored in the nodes that control $[D1,D2]$:
1. $SXi[D1,D2]$ is quite short (with respect to the interval $[D1,D2]$), and
2. For each date D in the interval $[D1,D2]$, the value SXiD stored in leaf D is easily computable from $SXi[D1,D2]$, and
3. The value stored at any leaf not belonging to $[D1,D2]$ is not easily predictable from $SXi[D1,D2]$.

Thus, if:

$$SXD = H(SX1D, SX2D, SX3D)$$

where H is a secure (preferably hashing) function, and each user X chooses the values SXi's (sufficiently) randomly and (sufficiently) independently, the scheme has all the desired properties. In particular:
 a. user X computes SXD very efficiently for every value of D;
 b. when presented with a court order to tap the line of user X between dates D1 and D2, each trustee i quickly computes $SXi[D1,D2]$. (In fact, he does not need to compute all values in the $2^n$-node tree, but only those of the nodes in control $[D1,D2]$);
 c. Having received $SXi[D1,D2]$ from every trustee i, the police can, very quickly and without further interaction with the trustees, compute:
   SXiD from $SXi[D1,D2]$ for every date D in the specified interval (in fact, its job is even easier since the SXiD's are computed in order and intermediate results can be stored)
   the master secret-session key SXD from the SXiD's, and
   the session key SXDY from SXD from any user Y talking to X in the specified time interval.

Note that both X's out-going and in-coming messages will be understood by the police, but no message sent or received before or after the time-interval specified by the court order will be intelligible to the police (unless a new proper court order is issued).

Of course, like in any fair PKC, users may not compute the session keys as above (for instance, by not using the standard equipment approved by the Government). This is easily detectable if X's conversations do not become understandable after a court order has been issued and the trustees have provided their information. Not using the right session keys, however, does not enable malicious users to abuse the government approved system F easily. In fact, it can be part of the protocol that when it becomes evident that a given user X maliciously does not use the proper session keys, the court orders the reconstruction of user X's secret key in F—which is possible since F is a fair PKC. Thus, users who maliciously tamper with the session keys can be tapped automatically, at any date, without any additional court order.

A fair PKC has advantages even if the people who do not use them are not punished. Fiar PKC's may be much more useful, however, if the government can determine whether a given cryptogram has been generated in the prescribed fair manner without any court order. That is, it would be desirable that the government, without understanding the messages exchanged (even because they are not fairly generated, or because they are fairly generated but no court order has been issued to tap the line of a given user) can tell whether they are generated in a fair way, that is, whether it would be capable of understanding them in case of a court order.

The following describes a technique for achieving this property. As will be seen, this technique may be applied to encryption devices that may or may not work in conjunction with a PKC or a fair PKC.

This technique again uses secure chips or other portable data carrier devices that include protected memory. Assume that each user has a secure chip or device that implements a fair PKC or any government-approved encryption algorithm. Each device will contain at least an encryption or decryption key for communicating with other users. In addition it will contain another key, KG, that is known to the government, but not to the user, since KG is inside the secure chip. Assume know that the user includes a terminal that commutes a message M which includes a ciphertext generated according to the government-approved algorithm. Prior to outputting N, the user's terminal applies a given function H (preferable a secure hashing one) to M so as to generate H(M). Then the device outputs both M and the encryption of H(M) with KG, that is E (KG,H(M)).

Assume now that the government, without wishing to understand the cleartext contained in M, wants to determine whether M was generated in an approved manner. Then all it has to do is apply H to M, so as to compute H(M) and then encrypt the result with KG and check whether the string E (KG,H(M)) sent by the user's device equals the value so computed. The user does not lose any privacy by this operation, since H(M) does not reveal the cleartext in M.

It should be noticed that KG need not be known to the Government, so long as the Government is assured that it pertains to a Government-approved device. Note further that if H itself is unknown to the user, there is no need to encrypt(M) with KG at all. Moreover, the user, even if she does not know H(M), need not worry about H(M) somehow containing a second encrypted version of the cleartext in M (which might be decodable by the government without any court order and without her knowledge). In fact, if H is chosen to be hashing, then H(M) is short, and no short string can possibly reveal the longer cleartext contained in M, which the user wishes to remain private.

It should be appreciated by those skilled in the art that the specific embodiments disclosed above may be readily utilized as a basis for modifying or designing other techniques and processes for carrying out the same purposes of the present invention. It should also be realized by those skilled in the art that such equivalent constructions do not depart from the spirit and scope of the invention as set forth in the appended claims.

What is claimed is:

1. A method, using a public-key cryptosystem, for enabling a predetermined entity to monitor communications of users suspected of unlawful activities while protecting the privacy of law-abiding users, wherein each user is assigned a pair of matching secret and public keys, comprising the steps of:
   breaking each user's secret key into shares;
   providing trustees pieces of information enabling the trustees to verify that the pieces of information include shares of a secret key of some given public key; and
   upon a predetermined request, having the trustees reveal the shares of the secret key of a user suspected of unlawful activity to enable the entity to attempt reconstruction of the secret key; and
   monitoring communications to the suspect user during a time period specified in the predetermined request.

2. The method as described in claim 1 wherein the predetermined entity is a government agency and the predetermined request is a court order.

3. A method, using a cryptosystem, for enabling a predetermined entity to monitor communications of users suspected of unlawful activities while protecting the privacy of law-abiding users, comprising the steps of:
   providing trustees pieces of information that are guaranteed to include shares of at least a secret decryption key; and
   upon a predetermined request, having the trustees reveal the shares of the secret decryption key to enable the entity to attempt to monitor communications to the suspected user during a time period specified in the predetermined request.

4. A method, using a cryptosystem, for enabling a predetermined entity to monitor communications of users suspected of unlawful activities while protecting the privacy of law-abiding users, comprising the steps of:
   having trustees hold pieces of information, wherein a piece of information is guaranteed to include a share of secret decryption key; and
   upon a predetermined request, having a given number of trustees each reveal the piece of information that includes the share of at least one secret decryption key to enable the entity to monitor communications to the suspected user.

5. The method as described in claim 4 further including the step of:
   characterizing the user's activities as unlawful if the entity is unable to monitor the user's communications.

6. The method as described in claim 4 wherein a given minority of trustees are unable to reconstruct the secret key.

7. A method, using a cryptosystem, for enabling a predetermined entity to monitor communications of users suspected of unlawful activities while protecting the privacy of law-abiding users, wherein one user has at least a secret decryption key, comprising the steps of:
   having trustees hold pieces of information that are guaranteed to include shares of a secret decryption key; and
   upon a predetermined request, having a given number of trustees each reveal the piece of information that includes the share of the secret decryption key to enable the entity to attempt to monitor communications to the user suspected of unlawful activities.

8. The method as described in claim 7 wherein upon the predetermined request all of the trustees each reveal the piece of information.

9. A method for revealing a user's secret value, comprising the steps of:
   having trustees hold pieces of information, wherein a piece of information includes a share of secret value; and
   upon a predetermined request, having a given number of trustees each reveal the piece of information that includes the share of the secret value to enable the entity to reconstruct the secret value at a prescribed time specified in the predetermined request.

10. A method, using a cryptosystem, for enabling a predetermined entity to monitor communications of users suspected of unlawful activities while protecting the privacy of law-abiding users, comprising the steps of:
    having trustees hold pieces of information that are guaranteed to include shares of a secret decryption key;
    upon a predetermined request, having the trustees send information to a secure device having its own internal clock; and
    using the secure device to enable the entity to monitor communications to a suspect user for an amount of time as specified in the predetermined request.

11. A method, using a cryptosystem, for enabling a predetermined entity to verify that a user is sending messages encrypted by means of a secure device implementing the given cryptosystem, wherein the secure device contains a secret key known to the entity, comprising the steps of:
    having the secure device use the given cryptosystem to generate a first string, the first string being an encryption of a message;

having the secure device use the secret key to generate a second string that guarantees to the entity that the first string was generated with the given cryptosystem.

12. A method, using a cryptosystem, for enabling a predetermined entity to confirm that users of a system exchange messages encrypted according to a predetermined algorithm, comprising the steps of:

providing each user in the system with a secure chip containing at least one secret key unknown to the user; and having the user send encrypted messages using the secure chip; and with each encrypted message sent by a user, having the secure chip also send a data string, computed using the secret key, to guarantee the entity that the encrypted message was generated by the secure chip using the predetermined algorithm.

13. The method as described in claim 12 further including the steps of:

providing trustees with pieces of information including shares of a secret key; and upon a predetermined request, having a given number of trustees send information including shares of the secret key to allow the entity to monitor communications to a suspect user.

* * * * *

REEXAMINATION CERTIFICATE (2674th)
United States Patent [19]
Micali

[11] B1 5,315,658

[45] Certificate Issued Sep. 12, 1995

[54] FAIR CRYPTOSYSTEMS AND METHODS OF USE

[76] Inventor: Silvio Micali, 459 Chestnut Hill Ave., Brookline, Mass. 02146

Reexamination Request:
No. 90/003,536, Aug. 22, 1994

Reexamination Certificate for:
Patent No.: 5,315,658
Issued: May 24, 1994
Appl. No.: 49,929
Filed: Apr. 19, 1993

Related U.S. Application Data

[63] Continuation-in-part of Ser. No. 870,935, Apr. 20, 1992, Pat. No. 5,276,737.

[51] Int. Cl.$^6$ .............................................. H04K 1/00
[52] U.S. Cl. ........................................ 380/30; 380/28; 380/48
[58] Field of Search ...................... 380/23, 24, 25, 28, 380/30, 48

[56] References Cited

U.S. PATENT DOCUMENTS

| | | | |
|---|---|---|---|
| 4,879,747 | 7/1989 | Leighton et al. | 380/23 |
| 4,944,009 | 7/1990 | Micali et al. | 380/46 |
| 4,995,081 | 7/1991 | Leighton et al. | 380/23 |

OTHER PUBLICATIONS

Micali, Silvio, "Fair Public-Key Cryptosystems", May 20, 1992.
Pedersen, Torben Pryds, "Distributed Provers with Applications to Undeniable Signatures", *EUROCRYPT '91 Abstracts*, University of Sussex, Brighton, UK, 8th–11th Apr. 1991, pp. 117–122.
Beth, Th., "Zur Diskussion gestellt", *Informatik-Spektrum*, vol. 13, 1990, pp. 204–215.
Feldman, Paul, "A Practical Scheme for Non-interactive Verifiable Secret Sharing", 1987, pp. 427–437.
Blakley, G. R., "Safeguarding Cryptographic Keys", *AFIPS-Conference Proceedings*, vol. 48, National Computer Conference, 1979, pp. 313–317.
Shamir, Adi, "How to Share a Secret", *Communication of the ACM*, vol. 22, No. 11, Nov., 1979, pp. 612–613.
DeMillo, Richard A.; Davida, George I.; Dobkin, David P.; Harrison, Michael A.; and Lipton, Richard J., *Cryptology in Revolution: Mathematics and Models*, San Francisco, Calif., Jan. 5–6, 1981, pp. 152–155.
Simmons, Gustavus J., "How to (Really) Share a Secret", *Advances in Cryptology-CRYPTO '88*, pp. 390–448.
Desmedt, Yvo; and Frankel, Yair, "Threshold Cryptosystems", *Advances in Cryptology-CRYPTO '89*, pp. 307–315.
Chor, Benny; Goldwasser, Shafi; Micali, Silvio; and Awerbuch, Baruch, "Verifiable Secret Sharing and Achieving Simultaneity in the Presence of Faults," IEEE Conf. on Foundations of CS, 1985, pp. 383–395.
Benaloh, Josh Cohen, "Secret Sharing Homomorphisms: Keeping Shares of a Secret Secret", *Advances in Cryptology-CRYPTO '86*, pp. 251–260.
Galil, Zvi; and Yung, Moti, "Partitioned Encryption and Achieving Simultaneity by Partitioning", Oct. 19, 1987, pp. 81–88.
Feldman, Paul Neil, "Optimal Algorithms for Byzantine Agreement" May 13, 1988.
Diffie, Whitfield; and Hellman, Martin E., "New Directions in Cryptography", *IEEE Transactions on Information Theory*, vol. IT-22, No. 6. Nov. 1976, pp. 644–654.
Pedersen, Torben Pryds, "Distributed Provers with Applications to Undeniable Signatures", *Advances in Cryptology-EUROCRYPT '91*, Brighton, UK, Apr. 1991, pp. 221–242.
G. Simmons, "How to Insure that Data Acquired to Verify Treaty Compliance are Trustworthy," *Proceedings IEEE*, vol. 76, No. 5, May 1988.
Merkle, Ralph C., "A Digital Signature Based on a Conventional Encryption Function," 1987.
Meyer, Carl H.; and Matgas, Stephen M., *Cryptography: A New Dimension in Computer Data Security*, 1982, pp. 350–428 (Chapters 8 and 9).
Beker, Henry; and Piper, Fred, *Cipher Systems*, 1982, pp. 292–305 (Sections 8.2 and 8.3).

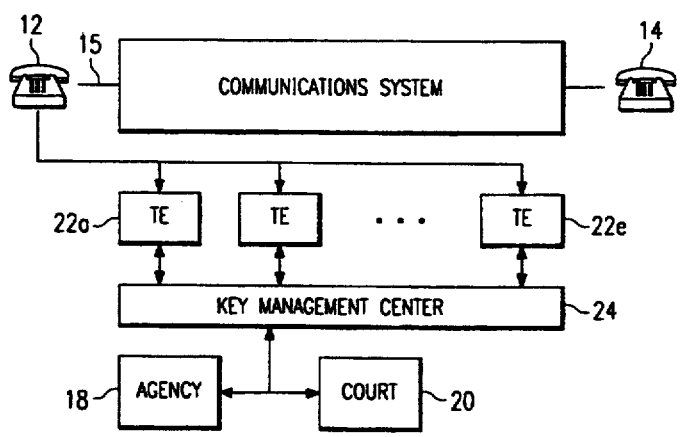

Longley, Dennis, *Data & Computer Security*, 1987, pp. 120 and 323.

Konheim, Alan G. *Cryptography–A Primer*, 1981, pp. 285–293 (Chapter 7).

Denning D. E. R., *Crytopgraph and Data Security*, 1982, pp. 161–179 (Sections 3.6 and 3.7).

Simmons, Gustavus J (editor), *Contemporary Cryptology–The Science of Information Integrity*, 1992, pp. 325–419 and 615–630 (Chapters 6, 7, and 13).

Micali, S., "Fair Public Key Cryptosystems," *Advances in Cryptology–CRYPTO '92*, Aug. 1992.

Micali, S., "Fair Cryptosystems," MIT/LCS/-TR-579.b, Nov. 1993.

Leighton, Tom; and Micali, S., "New Approaches to Secret-Key Exchange," Apr. 1993.

Leighton, Tom; and Kilian, Joseph, "Failsafe Key Escrow," Aug. 1994.

*Primary Examiner*—Tod R. Swann

[57] ABSTRACT

A method, using a public-key cryptosystem, for enabling a predetermined entity to monitor communications of users suspected of unlawful activities while protecting the privacy of law-abiding users, wherein each user is assigned a pair of matching secret and public keys. According to the method, each user's secret key is broken into shares. Then, each user provides a plurality of "trustees" pieces of information. The pieces of information provided to each trustee enable that trustee to verify that such information includes a "share" of a secret key of some given public key. Each trustee can verify that the pieces of information provided include a share of the secret key without interaction with any other trustee or by sending messages to the user. Upon a predetermined request or condition, e.g., a court order authorizing the entity to monitor the communications of a user suspected of unlawful activity, the trustees reveal to the entity the shares of the secret key of such user. This enables the entity to reconstruct the secret key and monitor the suspect user's communications.

REEXAMINATION CERTIFICATE ISSUED UNDER 35 U.S.C. 307.
THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8 and 10-12 is confirmed.

Claims 9 and 13 are determined to be patentable as amended.

9. A method for revealing a user's secret value to enable an entity to monitor suspect communications to the user, comprising the steps of:

having trustees hold pieces of information, *trustees being distinct from the entity*, wherein a piece of information includes a share of the secret value;

upon a predetermined request, having a given number of trustees each reveal the piece of information that includes the share of the secret value to enable the entity to reconstruct the secret value at a prescribed time specified in the predetermined request and thereby monitor said suspect communications without comprising the privacy of the other users' communications.

13. The method as described in claim 12 further including the steps of:

providing trustees with pieces of information including shares of a secret key; and upon a predetermined request, having a given number of trustees [send information including] *reveal their* shares of the secret key to allow the entity to monitor communications to a suspect user.

* * * * *